(Model.)
J. BRINKERHOFF.
ELASTIC ROLL.
No. 418,886. Patented Jan. 7, 1890.
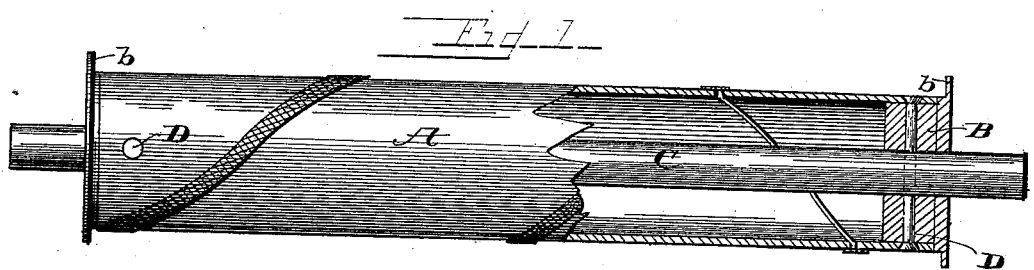
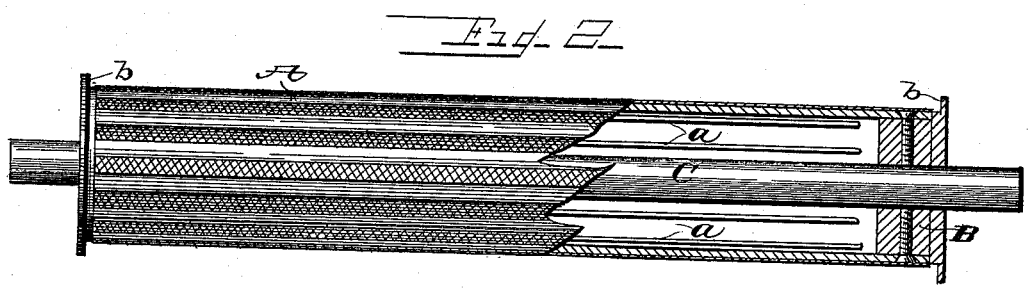
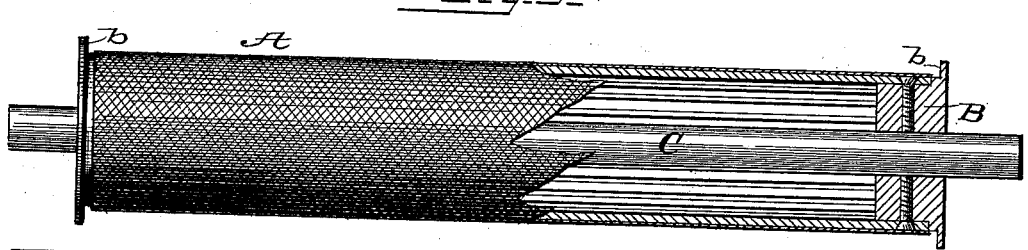
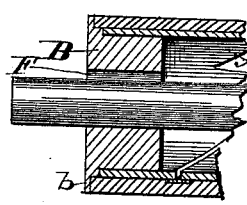 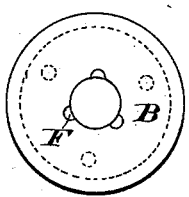 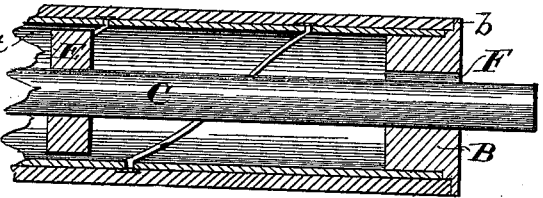
Witnesses
Inventor
Jacob Brinkerhoff
By his Attorneys
Whitaker & Prevost

UNITED STATES PATENT OFFICE.

JACOB BRINKERHOFF, OF AUBURN, NEW YORK.

ELASTIC ROLL.

SPECIFICATION forming part of Letters Patent No. 418,886, dated January 7, 1890.

Original application filed December 11, 1888, Serial No. 293,274. Divided and this application filed April 3, 1889. Serial No. 305,839. (Model.)

*To all whom it may concern:*

Be it known that I, JACOB BRINKERHOFF, a citizen of the United States, residing at Auburn, in the county of Cayuga and State of New York, have invented certain new and useful Improvements in Elastic Rolls; and I do hereby declare the following to be a full, clear, and exact description of the invention, such as will enable others skilled in the art to which it appertains to make and use the same.

My invention relates to elastic rolls for use in clothes-wringers and other places where such rolls may be desired; and it consists in certain novel features of construction, which will be hereinafter fully disclosed.

I have illustrated several forms in which I have contemplated embodying my invention in the accompanying drawings, and said invention is fully described in the following specification and claims, the present application being a division of application No. 293,274, filed December 11, 1888.

In the drawings, Figure 1 is a view, partly in section and partly in elevation, of an elastic roll constructed according to my invention. Figs. 2 and 3 are similar views of slightly-modified forms of rolls embodying my invention. Fig. 4 is a partial view of a roll similar to the one shown in Fig. 1, showing a central support for the wall of the cylinder and a coating of rubber applied to the same. Fig. 5 is an end view of one of the collars employed by me. Fig. 6 is a partial sectional view of a modified construction.

In the manufacture of the form of elastic roll in most general use rubber has usually been employed and wrapped or wound upon a shaft to the desired thickness, the ends of the shaft forming journals for the rolls.

I desire to provide an elastic body or foundation upon which may be placed a coating of rubber or other suitable material. To this end I provide a hollow cylindrical body A, which is of resilient material, and therefore capable of yielding when exposed to pressure. This cylindrical body is preferably formed as shown in Fig. 1, in which it is represented as consisting of a sheet of steel or other resilient material wound spirally, so as to form a cylindrical body of the desired diameter, the longitudinal edges of said material lying very close together, traversing the cylindrical body transversely; but in order to secure greater elasticity said edges are not joined rigidly together, if joined at all.

I might, if desired, employ a hollow cylinder and provide it with one or more slits longitudinally and spirally. This construction is substantially that shown in Fig. 1, and is fully shown in Fig. 4. In this preferred form the spiral is given a very steep pitch, so that the torsional strain upon it in operation will not decrease the size of the roll, and it will be seen that any great decrease in size will tend to loosen the resilient material from its elastic coating. It will be seen that such or other strain will have a tendency to bring the adjacent edges of the resilient material in contact, in which event so much greater resistance will be offered to further movement that it will practically prevent such a reduction of the size of the cylinder as to tear it loose from the coating. The ends of this cylinder are provided with collars B, having radial flanges *b*, extending outwardly at one end, and these collars are of such diameter as to fit snugly within the body A and extend therein until the flange *b* comes in contact with the end of the cylindrical body A. These collars B are provided with central apertures, through which extend the shaft C, and I prefer to pass a bolt or rivet through the cylindrical body A, the collar B, and the shaft C, and thereby secure the parts firmly together, as shown in Fig. 1, or it may be secured by screws, as shown in Figs. 2 and 3. The holes in the resilient material are preferably countersunk, and the heads of the bolts or screws are, as shown in this instance, preferably filed down flush with the surface of the body or foundation. The resilient material will therefore have a lateral engagement with its securing devices below the exterior of the cylinder. The body or foundation A is shown as covered with rubber or other suitable material, and it may be of any desired thickness. The longitudinal edges of the resilient material, of which the body A is composed, not being joined rigidly together permits an easy elastic yield of the body A. Where the flanges *b* are used, they serve to protect the outer edges of the rubber coating.

In Fig. 2 I have shown the main resilient body A as consisting of a hollow cylinder provided with longitudinal slits a, extending nearly to the ends of said cylinder. By this means the central portion of the body or foundation A will consist of separate or distinct strips of resilient material, and a great degree of elasticity will thereby be secured. The resilient body or foundation A may be provided with collars B and shaft C in the manner hereinbefore described. If found desirable, instead of employing a cylinder provided with slits a, the body or foundation may be composed of strips of resilient material having their ends secured to the collars B by means of screws or rivets, and the shaft C may be suitably secured to the collars B by any desired means, as shown in Fig. 3. (The resilient material should in all cases be secured at each end, in order that the proper degree of resistance may be secured.)

The layer of cloth or other material may cover the entire body A, or it may be simply applied to the part adjacent to the edges of the resilient material, if desired.

In Fig. 1 I have shown a strip of cloth or other material applied spirally to the body A and covering the slit formed by the edges of the spiral resilient material. In Fig. 2 similar strips are shown as covering the slits a of cylinder A. In Fig. 3 the body or foundation A is shown as completely covered with a fibrous or other material. It will be understood that when such a roll would be of service the body or foundation A may be used without any covering of rubber or other material. It will also be understood that in the form shown in Fig. 1 two or more strips may be used instead of one.

The shaft C, which extends through the body A from end to end and forms its journals, may be provided with one or more collars or flanges E intermediate the collars B, as shown in Fig. 4. The object of these collars or flanges E is to support the wall of the body A, upon which the pressure comes when it has yielded to a desired extent; and the collars or flanges E can be of any desired diameter to accomplish the purpose, and can be of any desired thickness or width of face. It will be seen that as soon as the wall of the body A under pressure comes in contact with the collar E it is re-enforced by the shaft C. The rubber coating is vulcanized to the body A, and to facilitate doing this I provide the collars B with openings or holes F through them and into the inside of the body A, as shown in Fig. 5. In vulcanizing, steam or vapor finds its way into the interior of the cylinder through the openings in the surface of the same. The object of these holes is to permit such steam or vapor to escape from the inside of body A, thereby preventing it from lifting the rubber from the surface of the body A along the longitudinal slits or openings in said body, the tendency of the pressure of said vapor and steam having a tendency to effect this. These holes F may be recesses extending longitudinally through the collar and opening into the central aperture for the shaft, or they may be formed independent of the central aperture, as shown in dotted lines, or in any other preferred manner.

When preferred, the body A may be provided with journals by employing gudgeons C', provided with collars B, instead of having a continuous shaft, as shown in Fig. 6.

I do not desire to be limited to my exact constructions, as they may be greatly varied or modified without departing from the spirit of my invention.

I am aware that it has been proposed to form an elastic roll by mounting a cylinder, formed from close spiral coils of narrow elastic metal or flat metallic wire, loosely on a shaft having enlarged portions beneath the outer ends of the cylinder, and covering such cylinder with a coating of elastic material, such elastic covering being connected with the shaft by flat lugs in a disk or wheel on said shaft entering radial slits in the ends of the elastic covering, the cylinder being between the shaft and the elastic covering and held from rotation only by frictional contact therewith, the covering being held or pressed against it at the ends by metallic bands surrounding the parts on the outside of the covering. The lugs which engage the elastic covering extend nearly or quite to the surface of the elastic material. This construction is one I do not propose to make or use, as the elastic cylinder and the shaft must be held in a certain fixed relation, in order to give the roll the necessary strength to resist the torsional strain to which it would be subjected in any known or ordinary use of the same, and to prevent under all circumstances the rotation of the shaft inside of the cylinder.

I am also aware that it has been proposed to construct a wringer-roll with a foundation consisting of two wooden pieces, one secured to the central shaft at each end of the roll. Each of the wooden pieces had spring-pieces separated from each other, extending to near the center of the roll. Said spring-pieces had their inner ends unconnected and unsupported, and were free to yield inwardly under pressure. The roll was completed by a coating of rubber loosely mounted over said springs. This construction I do not claim.

The particular construction of the collars and the mode of connecting the resilient material thereto is not herein claimed, as the same is made the subject-matter of my application, Serial No. 293,274, filed December 11, 1888.

Neither do I herein broadly claim a roll having a foundation composed of resilient material forming a hollow cylinder immovably connected at each end with the journals, as the same forms the subject-matter of my applications, Serial No. 281,646, filed August 1, 1888, and Serial No. 305,838, filed April 3, 1889.

What I claim, and desire to secure by Letters Patent, is—

1. An improved roller for wringing-machines, having a shaft, collar-pieces, a resilient metallic shell rigidly secured thereto and provided with slots extending from end to end, whereby the shell is enabled to yield slightly under pressure, and a coating of elastic substance firmly attached to the shell, substantially as specified.

2. The improved roll for wringing-machines herein described, consisting of a stiff rotary shaft, with collar-pieces to which is rigidly secured a shell of thin spring metal formed as a helix of high pitch, the edges of which are slightly apart, so as to be capable of yielding under pressure, and an elastic coating firmly cemented or affixed to the said shell, substantially as specified.

3. In a roll for wringing-machines, having a resilient metallic shell provided with longitudinal or spiral slots to give resiliency to the same, the covering of fabric connecting the adjacent edges of the slots and forming a support for the outer adherent coating of elastic substance, substantially as described.

4. The combination, with the tube and shaft, of a collar of less external diameter than the internal diameter of the tube arranged upon the shaft between the ends of the tube, substantially as described.

5. A body or foundation for an elastic roll consisting of a hollow cylinder of resilient material, a shaft extending through said cylinder, collars engaging said cylinder, provided with central apertures engaging said shaft, and recesses opening into said central apertures, substantially as described.

In testimony whereof I affix my signature in presence of two witnesses.

JACOB BRINKERHOFF.

Witnesses:
THOMAS H. KAVANAGH,
W. M. BRINKERHOFF.